(12) United States Patent  (10) Patent No.: US 7,486,431 B2
Rabinowitz  (45) Date of Patent: Feb. 3, 2009

(54) MANUFACTURE OF MICRO MIRROR BALLS AND CIRCUMSCRIBING BEARINGS FOR SOLAR ENERGY CONCENTRATION AND OTHER OPTICAL FUNCTIONS

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 233 days.

(21) Appl. No.: 11/559,770

(22) Filed: Nov. 14, 2006

(65) Prior Publication Data

US 2008/0111258 A1    May 15, 2008

(51) Int. Cl.
| | |
|---|---|
| A63B 39/00 | (2006.01) |
| B32B 37/00 | (2006.01) |
| B32B 38/10 | (2006.01) |
| B29D 11/00 | (2006.01) |
| G09G 3/34 | (2006.01) |
| G02B 26/00 | (2006.01) |

(52) U.S. Cl. .................. 359/296; 156/145; 156/154; 264/1.9; 345/107

(58) Field of Classification Search ............. 156/60, 156/70, 145, 154; 345/107; 359/296; 264/1.7, 264/1.9, 15, 112, 152, 241, 632, 633, 642; 384/100, 114, 192, 203, 206, 207, 208, 209, 384/210
See application file for complete search history.

(56) References Cited

U.S. PATENT DOCUMENTS

| | | | |
|---|---|---|---|
| 3,670,323 A | 6/1972 | Sobel et al. | |
| 4,261,653 A * | 4/1981 | Goodrich | ............... 359/296 |
| 4,298,448 A | 11/1981 | Muller et al. | |
| 5,754,332 A | 5/1998 | Crowley | |
| 5,808,783 A | 9/1998 | Crowley | |
| 5,815,306 A | 9/1998 | Sheridon et al. | |
| 5,914,805 A | 6/1999 | Crowley | |
| 5,930,026 A | 7/1999 | Jacobson et al. | |
| 5,982,346 A | 11/1999 | Sheridon et al. | |
| 6,072,621 A * | 6/2000 | Kishi et al. | ................. 359/296 |
| 6,120,588 A | 9/2000 | Jacobson | |
| 6,197,228 B1 | 3/2001 | Sheridon | |
| 6,211,998 B1 | 4/2001 | Sheridon | |
| 6,222,513 B1 | 4/2001 | Howard et al. | |
| 6,243,058 B1 | 6/2001 | Mikkelsen et al. | |
| 6,262,707 B1 | 7/2001 | Sheridon | |
| 6,294,401 B1 | 9/2001 | Jacobson et al. | |
| 6,323,989 B1 | 11/2001 | Jacobson et al. | |
| 6,335,818 B1 | 1/2002 | Torres | |

(Continued)

FOREIGN PATENT DOCUMENTS

WO    PCT/US02/20199    6/2002

*Primary Examiner*—Jeff Aftergut
*Assistant Examiner*—Brian R Slawski

(57) ABSTRACT

Method and apparatus are presented for the mass production manufacturing of planar mirrors inside transparent micro balls circumscribed by lubricated bearings for solar energy concentration and related applications such as optical switches, etc. These bearings permit rotational alignment of the balls with minimal friction. The preferred mass production process utilizes photolithography in an optical microlithographic photoresist process. The micro-balls are in the size range of ~1 micron ($1 \times 10\text{-}6$ m) to 1000 microns (1 mm). The micro-balls vary in geometry from spheres to cylinders to oblate ellipsoids to disks. The term "elements" is used to encompass all these shapes, which have one thing in common—a flat specularly reflecting mirrored surface. An important aspect of the manufacturing process is the containment of the mirrored micro-balls in the interior of lubricated bearings which are preferably concentric with the balls, which circumscribed concentricity can also be preferably accomplished by a microlithographic process.

20 Claims, 3 Drawing Sheets

U.S. PATENT DOCUMENTS

| | | |
|---|---|---|
| 6,570,700 B2 | 5/2003 | Engler et al. |
| 6,612,705 B1 | 9/2003 | Davidson et al. |
| 6,664,027 B2 | 12/2003 | Griffith et al. |
| 6,680,725 B1 | 1/2004 | Jacobson |
| 6,698,693 B2 | 3/2004 | Davidson et al. |
| 6,738,176 B2 | 5/2004 | Rabinowitz |
| 6,843,573 B2 | 1/2005 | Rabinowitz |
| 6,957,894 B2 | 10/2005 | Rabinowitz |
| 6,964,486 B2 | 11/2005 | Rabinowitz |
| 6,975,445 B1 | 12/2005 | Rabinowitz |
| 6,987,604 B2 | 1/2006 | Rabinowitz |
| 6,988,809 B2 | 1/2006 | Rabinowitz |
| 7,077,361 B1 | 7/2006 | Rabinowitz |
| 7,112,253 B2 | 9/2006 | Rabinowitz |
| 7,115,881 B2 | 10/2006 | Rabinowitz |
| 7,130,102 B2 | 10/2006 | Rabinowitz |
| 7,130,107 B2 | 10/2006 | Liu et al. |
| 7,133,183 B2 | 11/2006 | Rabinowitz |
| 2002/0089475 A1* | 7/2002 | Sheridon ..................... 345/84 |
| 2002/0131151 A1 | 9/2002 | Enger et al. |
| 2002/0196216 A1* | 12/2002 | Tokuyo et al. ................ 345/84 |
| 2005/0034750 A1 | 2/2005 | Rabinowitz |
| 2005/0195465 A1* | 9/2005 | Rabinowitz ................. 359/291 |
| 2006/0150968 A1 | 7/2006 | Rabinowitz |

* cited by examiner

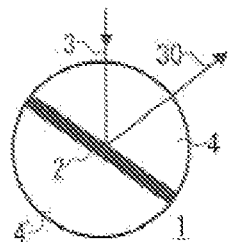
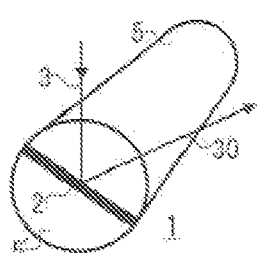
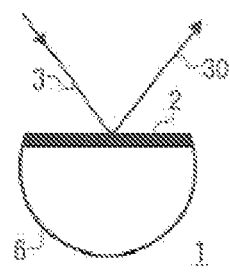
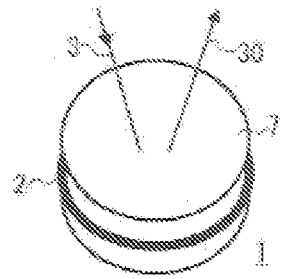
Fig. 1  Fig. 2  Fig. 3  Fig. 4
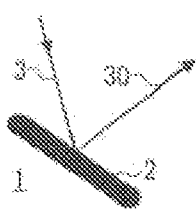
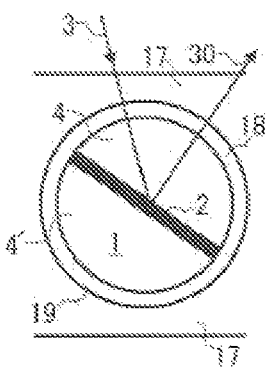
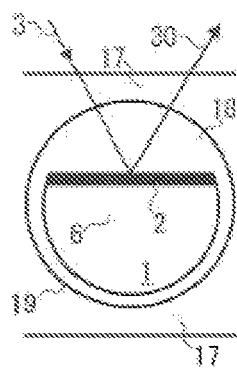
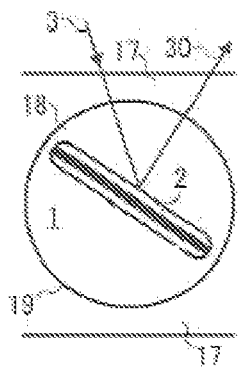
Fig. 5  Fig. 6  Fig. 7  Fig. 8
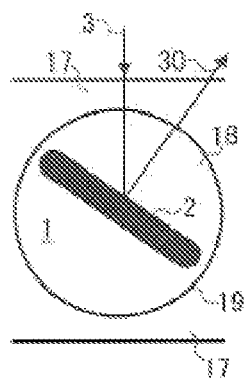
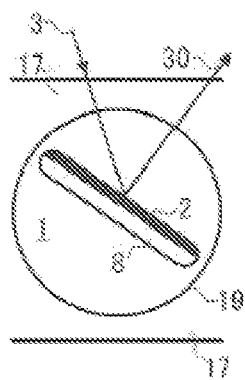
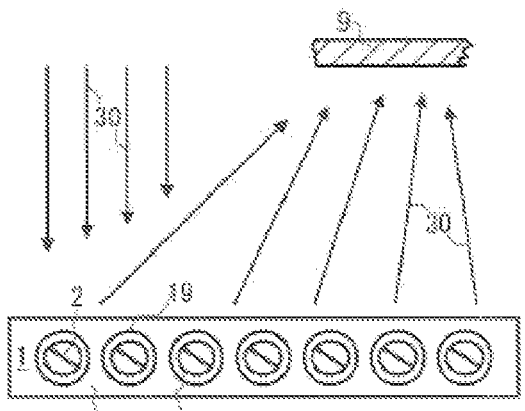
Fig. 9  Fig. 10  Fig. 11

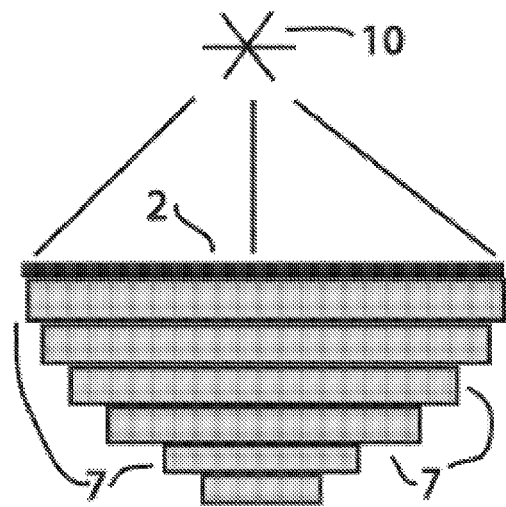
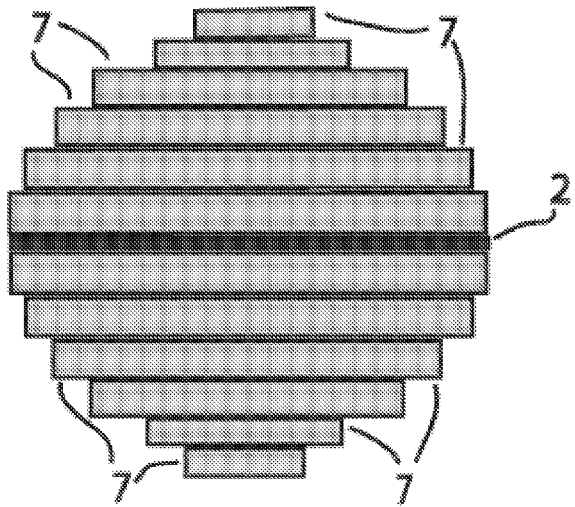
Fig. 12 a  Fig. 12 b
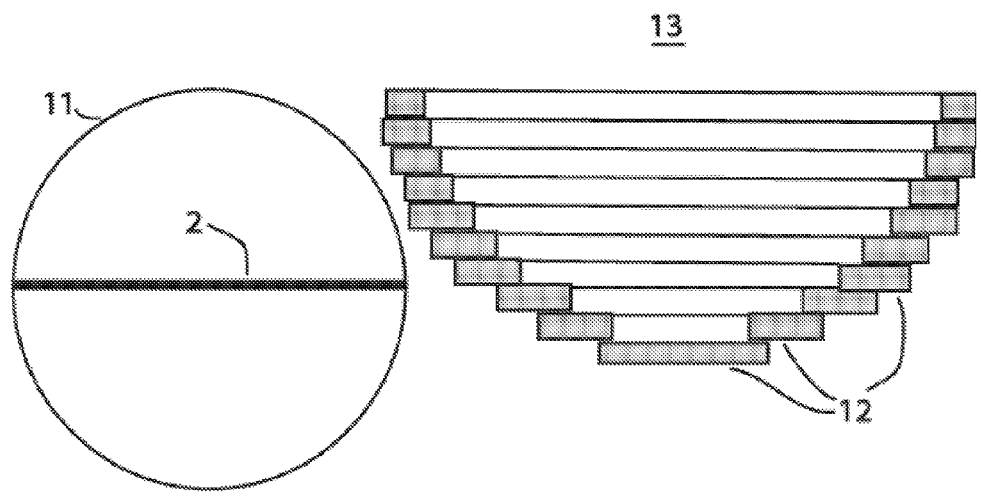
Fig. 12 c  Fig. 13

MANUFACTURE OF MICRO MIRROR BALLS AND CIRCUMSCRIBING BEARINGS FOR SOLAR ENERGY CONCENTRATION AND OTHER OPTICAL FUNCTIONS

BACKGROUND OF THE INVENTION

1. Field of the Invention

The instant invention relates to method and apparatus for the mass production of planar mirrors inside transparent micro balls circumscribed within lubricated spheroidal bearings for solar energy concentration and other optical functions. The preferred mass production process utilizes photolithography in an optical microlithographic photoresist process. The micro-balls are in the size range of 1 micron ($1\times10^{-6}$ m) to 1000 microns (1 mm), and preferably less than 100 microns (0.1 mm). An important preferred aspect of the manufacturing process is the circumscription of the mirrored micro-balls in the interior of lubricated spherical bearings which are concentric with the balls, which can also be preferably accomplished by a microlithographic process. These lubricated circumscribing bearings permit rotational alignment of the balls with minimal friction.

In one form the micro-balls are transparent in both hemispheres, and have a mid-plane mirror. In another form the micro-balls are transparent in one hemisphere with the other hemisphere being opaque or translucent, and have a mid-plane mirror. In other embodiments the micro-balls vary in geometry from cylinders to oblate ellipsoids to disks. The term "element" is used to encompass all these shapes, which have one thing in common—a flat specularly reflecting mirrored surface. These elements can track the light source, and aim and focus the reflected light as taught in the incorporated references below. The term "bearing" is used to denote the lubricated housing that circumscribes (encloses) these various elements.

2. Incorporation by Reference

In a solar energy application (as well as other functions), these elements in the form of transparent reflecting micro-balls and other shapes are a critical feature of a unique solar concentrator which directs sunlight to a receiver as described in the following patents and copending patent applications related to this case. The following U.S. patents, allowed patent applications, pending patent applications, and Solar Journal publication are fully incorporated herein by reference.

1. U.S. Pat. No. 7,133,183 by Mario Rabinowitz, "Micro-Optics Solar Energy Concentrator" issued on Nov. 7, 2006.
2. U.S. Pat. No. 7,130,102 by Mario Rabinowitz, "Dynamic Reflection, Illumination, and Projection" issued on Oct. 31, 2006.
3. U.S. Pat. No. 7,115,881 by Mario Rabinowitz and Mark Davidson, "Positioning and Motion Control by Electrons, Ions, and Neutrals in Electric Fields" issued on Oct. 3, 2006.
4. U.S. Pat. No. 7,112,253, by Mario Rabinowitz, "Manufacturing Transparent Mirrored Mini-Balls for Solar Energy Concentration and Analogous Applications" issued on Sep. 26, 2006.
5. U.S. Pat. No. 7,077,361, by Mario Rabinowitz, "Micro-Optics Concentrator for Solar Power Satellites" issued on Jul. 18, 2006.
6. U.S. Pat. No. 6,988,809 by Mario Rabinowitz, "Advanced Micro-Optics Solar Energy Collection System" issued on Jan. 24, 2006.
7. U.S. Pat. No. 6,987,604 by Mario Rabinowitz and David Overhauser, "Manufacture of and Apparatus for Nearly Frictionless Operation of a Rotatable Array of Micro-Mirrors in a Solar Concentrator Sheet" issued on Jan. 17, 2006.
8. U.S. Pat. No. 6,975,445 by Mario Rabinowitz, "Dynamic Optical Switching Ensemble" issued on Dec. 13, 2005.
9. U.S. Pat. No. 6,964,486 by Mario Rabinowitz, "Alignment of Solar Concentrator Micro-Mirrors" issued on Nov. 15, 2005.
10. U.S. Pat. No. 6,957,894 by Mario Rabinowitz and Felipe Garcia, "Group Alignment
11. U.S. Pat. No. 6,843,73 by Mario Rabinowitz and Mark Davidson, "Mini-Optics Solar Energy Concentrator" issued on Jan. 18, 2005.
12. U.S. Pat. No. 6,738,176 by Mario Rabinowitz and Mark Davidson, "Dynamic Multi-Wavelength Switching Ensemble" issued on May 18, 2004.
13. U.S. Pat. No. 6,698,693 by Mark Davidson and Mario Rabinowitz, "Solar Propulsion Assist" issued on Mar. 2, 2004.
14. U.S. Pat. No. 6,612,705 by Mark Davidson and Mario Rabinowitz, "Mini-Optics Solar Energy Concentrator" issued on Sep. 2, 2003.
15. Solar Energy Journal, Vol. 77, Issue #1, 3-13 (2004) "Electronic film with embedded micro-mirrors for solar energy concentrator systems" by Mario Rabinowitz and Mark Davidson.
16. U.S. Publication 2005-003750-A1 by Mario Rabinowitz, "Spinning Concentrator Enhanced Solar Energy Alternating Current Production" is Pending.
17. U.S. Publication 2006-0150968-A1 by Mario Rabinowitz, "Induced Dipole Alignment of Solar Concentrator Balls" is Pending.

3. Description of the Prior Art

The manufacturing processes as taught herein are distinct and different from the prior art. First, except for my own work, none of the prior art is concerned with the manufacture of mirrors in transparent micro-balls, or as part of the various elements described in the instant invention. Applications of the instant invention primarily relate to a Solar Concentrator, and secondarily to Optical Switching, Solar Propulsion Assist, and Active Reflection, Illumination, And Projection. Second none of the prior art (including my own) teaches the build up of spheres and circumscribing bearings from disks, such as can be done at the micron range by photolithography in an optical microlithographic photoresist process as taught in the instant invention.

The U.S. Patent Application #2003/0117424 A1 of Kinoshita, Hayashi, and Ozaki, entitled COLORED ROTATION SPHERICAL MATERIAL, MANUFACTURING METHOD THEREFOR, AND DISPLAY DEVICE is concerned with enhancing the degree of whiteness of a ball in a display device. They have no transparent hemisphere and there is no specular mirror, both of which are key aspects of the instant invention. As stated in their Abstract: "A colored rotation spherical material is configured so as to have two parts different from each other in color, such as a white part and a black part, and an optically reflective region between the two parts, such as a reflective layer. With this constitution, since the reflective layer reflects light which is usually absorbed in the black part, and the white part scatters the reflected light again, whiteness degree and reflectance increase." Their objective is just to enhance the white color in a display device. That is clearly why they are not trying to manufacture a mirror.

The U.S. Pat. No. 7,112,253, by Mario Rabinowitz, "Manufacturing Transparent Mirrored Mini-Balls for Solar Energy Concentration and Analogous Applications" details many different approaches to the manufacture of mirrored balls. However none of these anticipate the instant invention. This is also the case for all the issued and pending patent applications of Rabinowitz. Furthermore I am not aware of any prior art that anticipates the instant invention.

DEFINITIONS

"Collector" or "Receiver" as used herein denotes any device for the conversion of solar energy into other forms such as electricity, heat, pressure, concentrated light, etc.

"Concentrator" as used herein in general is a micro-mirror system for focussing and reflecting light. In a solar energy context, it is that part of a solar Collector system that directs and concentrates solar radiation onto a solar receiver or other device. As used herein, concentrator refers to an ensemble of focussing planar mirrors which acts as a thin almost planar mirror constructed with stepped varying angles so as to have the optical properties of a much thicker concave mirror. Heuristically, it can somewhat be thought of as the projection of thin variable-angular segments of small portions of a thick mirror upon a planar surface. It is a focusing planar reflecting surface much like a planar Fresnel lens is a focusing transmitting surface. The tracking-focussing property of an ensemble of tiny elements like balls which make up the focussing planar mirror is an essential manufacturing goal of the instant invention.

"Dielectric" refers to an insulating material in which an electric field can be sustained with a minimum power dissipation. As used herein, "dielectric" will be a convenient way of referring to either plastic or glass.

"Elastomer" is a material such as synthetic rubber or plastic, which at ordinary temperatures can be stretched substantially under low stress, and upon immediate release of the stress, will return with force to approximately its original length. Silicone elastomers have exceptional ability to withstand ultraviolet light degradation.

"Element" is a rotatable mirrored component of a concentrator, such as a ball, cylinder, disk, semi-sphere, etc.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Lexan" is General Electric's trade name for a group of polyesters formed from carbonic acid, and generally called polycarbonate (PC). Polycarbonate has excellent mechanical properties while at the same time it has an ease for molding and extrusion. Lexan has good dimensional stability, good resistance to creep, and a high distortion temperature.

"Lithography [also refer to "Photolithography" below] was developed for use in the Semiconductor industry for manufacturing microchips. It is also used in Microelectromechanical Systems (MEMS) applications, as it is one of the best methods currently in use for manufacturing devices on scales much smaller than a micron (micrometer). Although silicon lithographic technology is most advanced, other materials are also used. The emerging technology of a maskless lithography process and nanoimprint lithography for the semiconductor is also being used.

"Lucite" is DuPont's trade name for its transparent acrylic plastic and resins with no definite melting point.

"Mirror" as used herein refers to a highly reflective smooth surface (smooth on a size scale small compared to the wavelength of incident light). The smoothness achieves specular reflection.

"Photolithography or optical lithography" is a process used in semiconductor device fabrication to transfer a pattern from a photomask (also called reticle) to the surface of a substrate. Often silicon in the form of a wafer or disk is used as a choice of substrate, although there are several other options including, but not limited to glass, sapphire, and metal. Photolithography (also referred to as "microlithography" or "nanolithography") bears a similarity to the conventional lithography used in printing and shares some of the fundamental principles of photographic processes.

"Photoresist" is a chemical layer that 'hardens' when exposed to light (often ultraviolet). As used herein, it is applied on top of a substrate layer to be shaped. A lithography procedure may begin by depositing a layer of photoresist on the substrate which could be silicon (glass). A transparent plate with opaque areas printed on it, called a photomask or shadowmask, is placed between a source of illumination and the substraste, selectively exposing parts of the substrate to light. Then the photoresist is developed, in which areas of unhardened photoresist undergo a chemical change. After a hard-bake, subsequent chemical treatments etch away the silicon (glass) under the developed photoresist, and then etch away the hardened photoresist, leaving silicon (glass) exposed in the pattern of the original photomask. The glass may also be bombarded away with ions, fine carbarundum powder, or fine sand depending on the size of the desired pattern.

"Plastic" is a polymeric material (usually organic) which can be shaped by flow. The resin is the homogeneous starting material, whereas the "plastic" refers to the final product also containing fillers, plasticizers, stabilizers, etc.

"Plasticizer" is added to a material to make it softer, more flexible, or more moldable. It is also called a flexibilizer because it is an additive that gives an otherwise rigid plastic flexibility.

"Plastic paint" is a paint composed of a plastic in a solvent such that when the solvent is removed as by vaporization, a thin coating of the plastic a thin coating of the plastic remains on the coated surface.

"Plastic paint" is a paint composed of a plastic in a solvent such that when the solvent is removed as by vaporization, a thin coating of the plastic remains on the coated surface.

"Plexiglass" is a transparent plastic made from methyl methacrylate, similar to Lucite. Both can readily be made in sheet form.

"Silicone" as used herein refers to a heat-stable, rubber-like elastomer that is a water repellent, semiorganic polymer of organic radicals attached to silicon containing molecules, such as dimethyl silicone. Silicone elastomers are an excellent material within which to embed the mirrored balls or cylinders, because of their durability with respect to ultraviolet light, among other reasons.

"Specular reflection" occurs when the angle of reflection is equal to the angle of incidence of a light ray relative to a line perpendicular to the macroscopic reflecting surface, and lie in the same plane with it. Thus the reflected light ray travels in a definite predictable direction.

"Stepped structure" results when disks of different diameter are joined together to form a monolithic structure with corners that resembles a set of stairs.

"Thermoplastic" refers to materials with a molecular structure that will soften when heated and harden when cooled.

This includes materials such as vinyls, nylons, elastomers, fuorocarbons, polyethylenes, styrene, acrylics, cellulosics, etc.

SUMMARY OF THE INVENTION

There is one main object, and there are many aspects of this invention for the method and apparatus of manufacture of mirrored balls to be used in solar concentrators and analogous applications. All the aspects apply to the same main objective of being technically sound, economically viable, practical, and efficient in the construction of specular mirrors in spheroidal micro-balls circumscribed by lubricated bearings.

One aspect of the invention is the lithographic production of micro mirror balls circumscribed by lubricated bearings.

Another aspect of the invention is the production of glass micro mirror balls.

Another aspect of the invention is the production of lubricated glass bearings that circumscribe the micro mirror balls.

Another aspect of the invention is the production of glass bearings that circumscribe the micro mirror balls, all of which are embedded in a glass containment sheet.

Another aspect of the invention is the fabrication of as transparent a system as is economically feasible.

Other objects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

BRIEF DESCRIPTION OF THE DRAWINGS

FIG. 1 is a cross-sectional view of a single spheroidal ball with a midplane mirror. This ball is one of a multitude of optical elements which can track a light source and focus a concentrated light beam onto a receiver.

FIG. 2 is a cross-sectional view of a cylinder with an internal flat reflecting mirror. This cylinder is one of a multitude of optical elements which can track a light source and focus a concentrated light beam onto a receiver.

FIG. 3 is a cross-sectional view of a single semi-sphere with a mirror on its flat top. This mirrored semi-sphere is one of a multitude of optical elements which can track a light source and focus a concentrated light beam onto a receiver.

FIG. 4 is a perspective view of a circular disk with an internal flat reflecting mirror. This disk is one of a multitude of optical elements which can track a light source and focus a concentrated light beam onto a receiver.

FIG. 5 is a is a cross-sectional view of a circular metal disk highly reflecting mirror. This metal disk is one of a multitude of optical elements which can track a light source and focus a concentrated light beam onto a receiver.

FIG. 6 is a cross-sectional view of a single spheroidal element (ball or cylinder) with a midplane mirror. This element is circumscribed in a lubricated spheroidal (or cylindroidal) bearing, and is one of a multitude of optical elements which can track a light source and focus a concentrated light beam onto a receiver.

FIG. 7 is a cross-sectional view of a single semi-sphere with a mirror on its flat top. This element is circumscribed in a lubricated spheroidal bearing, and is one of a multitude of optical elements which can track a light source and focus a concentrated light beam onto a receiver.

FIG. 8 is a cross-sectional view of a circular disk with an internal flat reflecting mirror. This element is circumscribed in a lubricated spheroidal bearing, and is one of a multitude of optical elements which can track a light source and focus a concentrated light beam onto a receiver.

FIG. 9 is a cross-sectional view of a circular metal disk highly reflecting mirror. This element is circumscribed in a lubricated spheroidal bearing, and is one of a multitude of optical elements which can track a light source and focus a concentrated light beam onto a receiver.

FIG. 10 is a cross-sectional view of a circular disk with a top surface flat reflecting mirror. This element is circumscribed in a lubricated spheroidal bearing, and is one of a multitude of optical elements which can track a light source and focus a concentrated light beam onto a receiver.

FIG. 11 is a cross-sectional view of an ensemble of micromirrors circumscribed in lubricated bearing cavities within a containment sheet of a micro-optics concentrator. These micro-mirrors are rotatable so they can focus incident sunlight onto a receiver.

FIG. 12a is a cross-sectional view of an element (hemispheroidal or hemicylndroidal in this case) made of conjoined disks. A vaporizer is depositing a thin layer of metal on the exposed top of the hemispheroidal element.

FIG. 12b is a cross-sectional view of a completed element (spheroidal or cylndroidal in this case) made of conjoined disks with a mirrored midplane showing a stepped contour prior to smoothing.

FIG. 12c is a cross-sectional view of a completed element (sphere or cylinder in this case) that was made from conjoined disks with a mirrored midplane with the disk interfaces annealed away and the steps smoothed out.

FIG. 13 is a cross-sectional view of a hollow bearing (shown hemispheroidal or hemicylndroidal in this case) made of conjoined disks.

DETAILED DESCRIPTION OF THE PRESENTLY PREFERRED EMBODIMENTS

Figure 14:
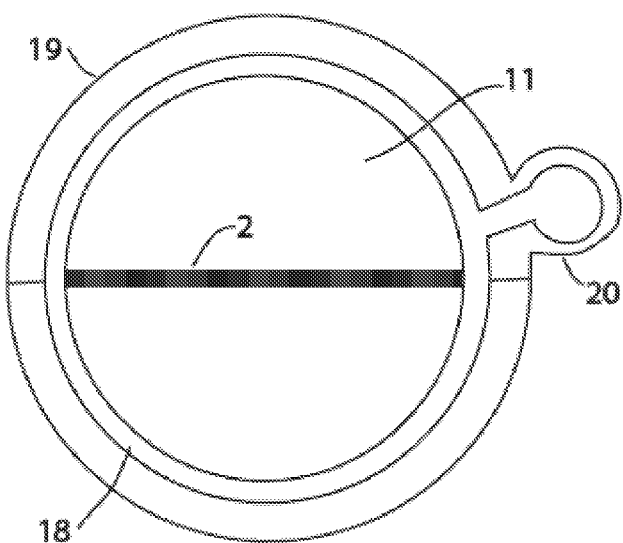
FIG. 14 is a cross-sectional view of a completed smoothed element (sphere or cylinder in this case with mid-plane mirror) inside a completed smooth bearing.

As is described in detail, the manufacturing objectives of the instant invention may be accomplished by any of a number of ways separately or in combination, as taught herein.

FIG. 1 shows a rotatable element 1 of a focussing planar micro-mirror 2 with a mid-plane flat reflecting surface which specularly reflects incident light ray 3 so that the reflected light ray 30 is in the same plane and the angle of refection equals the angle of incidence. The element 1 shown here is a cross-sectional view of a single spheroidal ball of top transparent dielectric semi-sphere 4, and bottom material 4'. The ball element 1 is capable of two-axis tracking of the light source such as the sun, as are most of the different geometrical elements shown in FIGS. 1-11. The top semi-sphere 4 must be transparent, and the bottom semi-sphere 4' is preferably a transparent dielectric, but may be opaque and may even be metallic. This element 1 is one of a multitude of optical elements which can track a light source and focus a concentrated light beam onto a receiver as described in detail in references 1-17 above, especially reference 1.

FIG. 2 shows a rotatable element 1 of a focussing planar micro-mirror 2 with an internal flat reflecting surface inside the element 1. The mirror 2 is in the plane between top hemicylinder 5 and bottom hemicylinder 5', and specularly reflects the incident light ray 3 with the reflected light ray 30. The element 1 shown is a perspective view of a cylinder which is capable of single-axis tracking of the light source such as the sun. The top semi-cylinder 5 must be transparent, and the bottom semi-cylinder is preferably transparent, but may be opaque and may even be metallic. This element 1 is one of a multitude of optical elements which can track a light source and focus a concentrated light beam onto a receiver.

FIG. 3 is a cross-sectional view of a single rotatable element 1 which is a semi-sphere 6 with a flat top. Herein it is called a flat-top ball 6 with a mirror 2 which receives incident light 3 and returns reflected light 30. The flat on the top of the ball can be produced by any of standard techniques such as machining, shearing, die extrusion, etc.; or by photolithography process as will be subsequently discussed in conjunction with FIGS. 12-14. The technique or combination of techniques used, will depend on the degree of optical flatness required. The semi-sphere 6 is preferably transparent, but may be opaque, and may even be metallic. This element 1 is one of a multitude of optical elements which can track a light source and focus a concentrated light beam onto a receiver.

FIG. 4 shows a perspective view of a rotatable element 1 of a focussing planar micro-mirror 2 with an internal flat reflecting surface inside the element 1. The element 1 is formed of two circular dielectric disks 7, between which is sandwiched mirror 2 that specularly reflects the incident light ray 3 with the reflected light ray 30. The top disk must be transparent, and the bottom disk is preferably transparent, but may be opaque, and may even be metallic. This element 1 is one of a multitude of optical elements which can track a light source and focus a concentrated light beam onto a receiver.

FIG. 5 shows a cross-sectional view of a rotatable element 1 which is a circular disk with rounded edges that serves as a metallic micro-mirror 2, which specularly reflects the incident light ray 3 with the reflected light ray 30. The element 1 is one of a multitude of optical elements which can track a light source and focus a concentrated light beam onto a receiver.

FIG. 6 is a cross-sectional view showing the element 1 of FIG. 1. This cross-section depicts either a rotatable ball or a rotatable cylinder, completely encompassed with a lubricating fluid 18 which is circumscribed inside a concentric bearing 19 of containment sheet 17. Thus the confined and lubricated element 1 can make a nearly frictionless rotation, with hardly any undesirable displacement. The focussing planar micro-mirror 2 is a mid-plane flat reflecting surface which specularly reflects incident light ray 3 with the reflected light ray 30. An ensemble of such elements can thus be aligned with the application of moderate power. It is preferable to utilize a liquid 18 whose index of refraction matches the clear hemisphere or clear hemicylinder, and it should have the same density as element 1 to minimize buoyant forces. The index of refraction of the containment sheet 17, the liquid 18, and the optically transmissive upper portion of elements 1 should all be approximately equal. The elements 1 should be roughly balanced to minimize gross gravitational orientation.

FIG. 7 is a cross-sectional view of a single rotatable element 1 which is a semi-sphere 6 with a flat top micro-mirror 2 with rounded edges. The element 1 is completely encompassed with a lubricating fluid 18 which is circumscribed inside a concentric bearing 19 of the containment sheet 17. Also shown is the incident light ray 3 and the reflected light ray 30.

FIG. 8 is a cross-sectional view of a rotatable element 1 of a focussing planar micro-mirror 2 between circular transparent dielectric top disk 7, and bottom disk 7' with rounded edges. The element 1 is completely encompassed with a lubricating fluid 18 which is circumscribed inside a concentric bearing 19 of containment sheet 17. Also shown is the incident light ray 3 and the reflected light ray 30.

FIG. 9 shows a cross-sectional view of a rotatable element 1 which is a circular disk metallic micro-mirror 2 with rounded edges, that is completely encompassed with a lubricating fluid 18 which is circumscribed inside a concentric bearing 19 of containment sheet 17. Also shown is the incident light ray 3 and the reflected light ray 30.

FIG. 10 shows a cross-sectional view of a rotatable element 1 which is a flat circular disk micro-mirror 2 on the top surface with backing 8, that is completely encompassed with a lubricating fluid 18 which is circumscribed inside a concentric bearing 19 of containment sheet 17. The backing 8 is present to give the micro-mirror 2 rigidity if the mirror is made of a highly reflective thin film of Chromium or Aluminum. The backing 8 may be metallic or dielectric. Also shown is the incident light ray 3 and the reflected light ray 30.

FIG. 11 is a cross-sectional view of concentrator system comprising an ensemble of elements 1 containing micro-mirrors 2 circumscribed in lubricant 18 inside spherical cavities 19 in a micro-optics concentrator. These micro-mirrors 2 are thus rotatable with minimal friction, so they can focus incident light 3 with concentrated reflected light 30 onto a receiver 9.

For example for a concentrator of elements 1 which are balls as shown, with a spherical bearing 19 diameter of 100 microns ($10^{-4}$ m=0.1 mm) a million balls would cover an area ~100 $cm^2$. A typical concentrator would have an enormous number of billions of balls, which track and focus a source of light such as the sun either singly or in groups of millions.

FIG. 12*a* is a cross-sectional view of an element (hemispheroidal or hemicylindroidal in this case) made of conjoined disks 7. A vaporizer 10 deposits a thin layer of metal on the exposed top of the hemispheroidal element to form a planar mirror 2. The hemispheroidal element can be smoothed and used as a micro-mirrored hemisphere or hemicylinder, or it can be combined with another hemispheroidal or hemicylindroidal element in the process of making a spheroid or cylindroid of conjoined disks.

When it is desired to fabricate a small element between 1 and 50 microns in diameter, lithography is ideal because it affords exact control over the shape and size of the objects it creates, and because it can create patterns over an entire surface simultaneously. A spinner is used to apply photoresist to the surface of the substrate. Most types of photoresist are available in "positive" and "negative" forms. With positive resists the area that is opaque (masked) on the photomask corresponds to the area where photoresist will remain upon developing (and hence where substrate will remain at the end of the cycle). Negative resists result in the inverse, so any area that is exposed will remain, whilst any areas that are not exposed will be developed. After developing, the resist is usually hard-baked before subjecting to a chemical etching stage or bombarding stage (ions, carbarundum powder, sand particles, etc.) which will remove the material underneath.

FIG. 12*b* is a cross-sectional view of a completed element (spheroidal or cylindroidal in this case) made of conjoined disks 7 with a mirrored midplane 2 showing a stepped contour prior to smoothing. The disks 7 may be solid or hollow disks (cf. to FIG. 13). Hollow disks may be used for the elements if the index of refraction of the disk material is close to that of air i.e. 1. This reduces the weight of the completed element.

A typical lithography procedure begins by depositing a layer on the substrate e.g. glass, such as a layer of photoresist—a chemical that 'hardens' when exposed to light (often ultraviolet). A transparent plate with opaque areas printed on it called a photomask or shadowmask, is placed between a source of illumination and the wafer, selectively exposing parts of the substrate to light. Then the photoresist is developed, in which areas of unhardened photoresist undergo a chemical change. After a hard-bake, subsequent chemical treatments etch away the material under the developed photoresist, and then etch away the hardened photoresist, leaving disks 7 in the pattern of the original photomask.

The process can be automated by means of handling robots, bake/cool plates, and coat/develop units. The robots are used to transfer disks from one module to another. The initial disk material is heated to a temperature sufficient to drive off any moisture that may be present on its surface. Hexa-methyl-disilizane (HMDS) is applied in either liquid or vapor form in order to promote better adhesion of the photoresist photosensitive polymeric material. Photoresist is dispensed in a liquid form onto the wafer as it undergoes rotation. The speed and acceleration of this rotation are important parameters in determining the resulting thickness of the applied photoresist. The photoresist-coated disk is then transferred to a hot plate, where a "soft bake" is applied to drive off excess solvent before the wafer is introduced into the exposure system.

FIG. 12c is a cross-sectional view of a completed element 11 (sphere or cylinder in this case) that was made from conjoined disks 7 with a mirror 2 in the midplane with the disk interfaces annealed away. The steps can be smoothed out or eliminated by surface tension at elevated temperature, or by an abrasion process. The designation "element 11" is used for the completed "smoothed element" to denote formation from an initial step process. For practical purposes it is essentially equivalent to the prior designation of "element 1."

In making the disks 7 which are bonded together to form an element the simplest Exposure system is a contact printer or proximity printer. A contact printer involves putting a photomask in direct contact with the disk material. A proximity printer puts a small gap in between the photomask and disk which is preferably glass. The photomask pattern is directly imaged onto the photoresist on the disk in both cases. The resolution is roughly given by the square root of the product of the wavelength and the gap distance. Hence, contact printing with zero gap distance ideally offers best resolution. Defect considerations have prevented its widespread use; however its low cost makes it appealing. The cost will be low due to the lack of a need for complex optics, expensive light sources, or specially tailored resists.

The more commonly used approach for photolithography is projection lithography. The desired pattern is projected from the photomask onto the disk in either a machine called a stepper or scanner. The stepper/scanner functions similarly to a slide projector. Light from a mercury arc lamp or excimer laser is focused through a complex system of lenses onto a "mask" (also called a reticle), containing the desired image. The light passes through the mask and is then focused to produce the desired image on the wafer through a reduction lens system. The reduction of the system can vary depending on design, but is typically on the order of 4×-5× in magnitude.

When the image is projected onto the wafer, the photoresist material undergoes some wavelength-specific radiation-sensitive chemical reactions, which cause the regions exposed to light to be either more or less acidic. If the exposed regions become more acidic, the material is called a positive photoresist while if it becomes less susceptible it is a negative photoresist. The resist is then "developed" by exposing it to an alkaline solution that removes either the exposed (positive photoresist) or the unexposed (negative photoresist). This process takes place after the disk is transferred from the exposure system.

A post-exposure bake is performed before developing, typically to help reduce standing wave phenomena caused by the destructive and constructive interference patterns of the incident light. The develop chemistry is delivered in a similar fashion to how the photoresist was applied. The resulting wafer is then "hardbaked" on a bake plate at high temperature in order to solidify the remaining photoresist, to better serve as a protecting layer in future ion implantation, wet chemical etching, or plasma etching.

FIG. 13 is a cross-sectional view of a hollow half-bearing 13 (shown hemispheroidal or hemicylindroidal in this case) made of conjoined hollow disks 12. The hollow disks 12 may be fabricated separately from the disks 7 which are used to form the ultimately smoothed element 11. A frugal alternative is to use the same plate from which the disks 7 are cut out, and then utilize the remaining hole as the basis for the hollow disks 12 which form the ultimately smooth bearing 10. The steps may be smoothed out or eliminated by surface tension at elevated temperature, or by an abrasion process.

The ability to project a clear image of a very small feature onto the disk is limited by the wavelength of the light that is used and the ability of the reduction lens system to capture enough diffraction orders from the illuminated mask. Current state-of-the-art photolithography tools use deep ultraviolet (DUV) light with wavelengths of 248 and 193 nm, which allow minimum resist feature sizes down to 50 nm.

Optical lithography can be extended to feature sizes below 50 nm using 193 nm and liquid immersion techniques. Also termed immersion lithography, this enables the use of optics with numerical apertures exceeding 1.0. The liquid used is typically ultra-pure, deionized water, which provides for a refractive index above that of the usual air gap between the lens and the disk surface. This is continually circulated to eliminate thermally-induced distortions.

Tools using 157 nm wavelength ultraviolet light in a manner similar to current exposure systems have been developed. These were once targeted to succeed 193 nm at the 65 nm feature size node but have now all but been eliminated by the introduction of immersion lithography. This was due to persistent technical problems with the 157 nm technology and economic considerations that provided strong incentives for the continued use of 193 nm technology. High-index immersion lithography is the newest extension of 193 nm lithography to be considered. In 2006, features less than 30 nm (0.03 micron) were demonstrated by IBM using this technique. Other alternatives are extreme ultraviolet lithography (EUV), nanoimprint lithography, and contact printing. EUV lithography systems are currently under development that will use 13.5 nm (0.013 micron) wavelengths, approaching the regime of X-rays. Nanoimprint lithography is being investigated by several groups as a low-cost, non-optical alternative.

FIG. 14 is a cross-sectional view of a completed smoothed element 11 (sphere or cylinder in this case) with mid-plane mirror 2 inside a completed circumscribed smooth bearing 19 with lubricant 18. The smooth bearing 19 is formed by joining together the two half-bearings 13 after they have been smoothed. Also shown is the sealed cap-off 20 through which the lubricant 18 is introduced between the element 11 and the bearing 19. After completion, the bearings 19 are placed in a concentrator sheet 17. The cut out technique described in conjunction with FIGS. 12-13, uses circular disks for balls and circular holes for the bearings. FIG. 1 shows the outer surface of the bearing as also spheroidal, but it can be cubic, hexagonal-like, or other shapes as it is embedded in sheet 17.

The image for the disk mask can originate from a computerized data file. This data file is converted to a series of polygons and written onto a square fused quartz substrate covered with a layer of chrome using a photolithographic process. A beam of electrons is used to expose the pattern defined in the data file and travels over the surface of the substrate in either a vector or raster scan manner. Where the photoresist on the mask is exposed, the chrome can be etched away, leaving a clear path for the light in the stepper/scanner systems to travel through.

Optical lithography can be extended to a resolution of 15 nm by using the short wavelengths of 1 nm X-ray lithography for the illumination. This is implemented by the proximity printing approach. The technique is developed to the extent of batch processing. The extension of the method relies on Near Field X-rays in Fresnel diffraction: a clear mask feature is "demagnified" by proximity to a wafer that is set near to a "Critical Condition". This Condition determines the mask-to-wafer Gap and depends on both the size of the clear mask feature and on the wavelength. The method is rapid because it uses broadband, and simple because it requires no lenses.

Work is in progress on an optical maskless lithography tool. This uses a digital micro-mirror array to directly manipulate reflected light without the need for an intervening mask. Throughput is inherently low, but the elimination of mask-related production costs means that such a system would be far more cost-effective for small-scale manufacturing applications.

Figure 15:
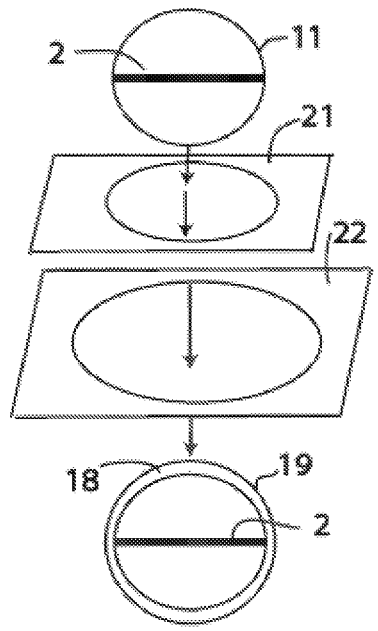
FIG. 15 is a perspective view of a smoothed element (sphere in this case with mid-plane mirror) passing through a succession of fluid films such that a bearing is finally formed which circumscribes a layer of lubricant adjacent to said element.

FIG. 15 is a perspective view of smoothed element 11 (sphere in this case with mid-plane mirror 2) passing through a succession of fluid films 21 and 22 such that a bearing is finally formed which circumscribes a layer of lubricant 19 adjacent to said element. The first film 22 then forms the bearing 19 around the lubricant by surface tension. Additional films may be used to build up the thickness of the bearing 19. These films may be liquid glass, may contain polymer building blocks, cross linking agents, and overcoat agents.

Figure 16:
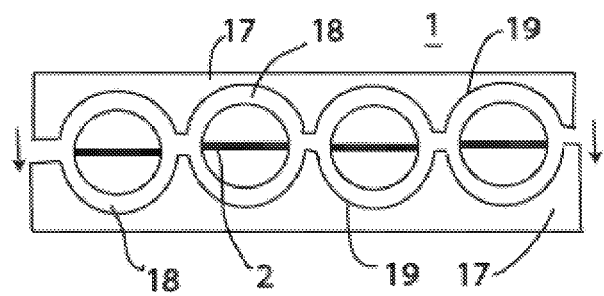
FIG. 16 is a cross-sectional view of completed smoothed elements (spheres or cylinders in this case) surrounded by lubricant each with a mid-plane mirror inside a completed smooth bearing, whose halves are built into the two sheets being joined together to form a concentrator.

FIG. 16 is a cross-sectional view of completed smoothed elements (spheres or cylinders in this case) surrounded by lubricant 18 each with a mid-plane 2 inside completed smooth half bearings 19 whose halves are built into the two containment sheets 17 being joined together to form a concentrator. The half bearings 19 can be placed in the sheets 17 after being fabricated such as described in conjunction with FIGS. 13 and 14. Alternatively, the bearings 19 may be fabricated directly in the sheet 17 by a mask and etch process; bombardment by ions, carborandum powder, or sand particles; or other boring means.

DISCUSSION OF PRESENTLY PREFERRED EMBODIMENTS

There are many tradeoffs in manufacturing the transparent reflecting micro-mirrored elements (balls, etc.) and bearings of the instant invention for solar energy and analogous applications. One tradeoff is between materials costs versus manufacturing costs. Another tradeoff relates to ease of manufacturing for small versus large production runs. Flat planar disks as described in conjunction with FIGS. 5 and 9 are the simplest and cheapest micro-mirrors to manufacture. Friction may be expected to be higher for disks in a spherical bearing than for balls. Thus disk rotation may be expected to require larger power dissipation even though the moment of inertia is less for disks requiring less power that goes into kinetic energy. Rotational control of the balls can be achieved by electrostatic, magnetostatic, electromagnetic, electrophoretic, and/or magnetophoretic means as described in the referenced patents and patent applications. The conclusions reached today may well have to be changed in the light of new costs and new developments in the future.

Even if the relative costs remain fixed, a change in product yields with increased sophistication of the manufacturing process may tip the balance in a new direction. What may be best for low concentrations of 5× to 20× for a concentrator, may not be true for 100× and higher as different considerations come into play such mirror flatness and angular resolution. Similarly, the desired size of the balls favors some manufacturing steps over others. The balls may range in size from 4 microns to 1 mm. For the smaller balls, a microlithographic process is preferred.

To remove crazing, cloudiness, etc. the surface can be dissolved or etched. Hydrofluoric acid is the most active acid that will dissolve glass, leaving a clear finish. In conjunction with sulphuric acid, hydrofluoric acid produces a high gloss finish such as is used in polishing lead glass. Hot sodium hydroxide (NaOH) is less effective. Nitric acid etches glass slowly, by consuming the silicon surface to form a layer of silicon dioxide. Heat together with surface tension can be used to remove surface imperfections, round steps, and eventually remove steps.

Flatness of the mirror is not critical for low concentrations, but for a 100× or higher concentrator, mirror flatness and high pointing accuracy of better than + or −0.5 degrees is desirable, and for 1000× an alignment accuracy of + or −0.05 degrees may be necessary. Similarly high alignment accuracy may be needed when using the reflecting balls in analogous applications for an optical switch, for rocket boost, and for light projection such as are taught in Rabinowitz patents such as U.S. Pat. Nos. 7,133,183; 6,975,445; and 7,133,183.

Examples of materials that are appropriate dielectrics for making the balls, bearings, and sheets are: glass, acrylic polymers made from acrylic derivatives such as acrylic acid, methacrylic acid, ethyl acrylate, and methyl acrylate; glass, castor wax, carnuba wax, polyethylene, polyester, etc. Some of the desirable plastics have trade names such as lucite, plexiglass, and texan. A plasticizer can be used to soften some of these materials while they are being fabricated. The group of materials known as Thermoplastics also have desirable properties. Plastic paint is helpful where thin initially liquid films are needed. Thermoplastic have a molecular structure that will soften when heated and harden when cooled. This includes materials such as vinyls, nylons, elastomers, fuorocarbons, polyethylenes, styrene, acrylics, cellulosics, etc. While silicone is not as resistant to ultraviolet light as glass, it is quite hardy in a uv environment and has the advantage of being flexible.

Transparent glass is much cheaper than plastic and is preferable for longevity considerations in an ultraviolet light environment. However, because glass has a higher melting point and higher reactivity in the molten state, manufacturing glass balls with an internal mirror by conventional processes is a formidable challenge. However photolithography in an optical microlithographic photoresist process circumvents the problems encountered by more conventional processes.

*While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

The invention claimed is:

1. In a solar concentrator, an assembly of micro-mirrored elements and their containment sheet made according to the steps of
   a) forming transparent disks of approximately the same index of refraction;
   b) joining said disks together so that they have a common axis of symmetry to form a monolithic stepped structure;
   c) bonding a mirror to the largest diameter disk;
   d) producing a disk structure that is transparent on at least one side of said mirror; and
   e) smoothing out said stepped structure.

2. The solar concentrator of claim 1 wherein said disks are fabricated in the size range of 1 micron to 1000 microns in diameter.

3. The solar concentrator of claim 1 wherein said disks are fabricated by a lithographic process.

4. The solar concentrator of claim 1 wherein each of said micro-mirror elements is introduced inside a lubricated bearing.

5. The solar concentrator of claim 1 wherein each of said micro-mirror elements is introduced inside a bearing that has been made by joining together a series of hollow disks.

6. The solar concentrator of claim 1 wherein each of said micro-mirror elements is introduced inside a lubricated bearing that has been made by dropping said micro-mirror element through at least one fluid film.

7. The solar concentrator of claim 1 wherein an assembly of micro-mirror elements is introduced and sealed inside lubricated bearings that are indigenous in the containment sheet that holds said assembly.

8. In a concentrator, an assembly of hollow micro-mirrored elements and their containment cavities made according to the steps of
   a) forming a series of annular disks;
   b) joining said annular disks together so that they have a common axis of symmetry to form a monolithic stepped structure;
   c) bonding a mirror to the largest diameter annular disk;
   d) producing a disk structure that is transparent on at least one side of said mirror; and
   e) smoothing out said stepped structure.

9. The concentrator of claim 8 wherein said annular disks are manufactured by a lithographic process.

10. The concentrator according to claim 8, wherein the micro-mirror element is disposed inside a lubricated cavity.

11. The concentrator according to claim 8, wherein the micro-mirror element is circumscribed by a cavity made by joining together a series of circumscribing hollow disks.

12. The concentrator according to claim 8, wherein the micro-mirror element is introduced inside a circumscribing cavity made by dropping said micro-mirror element through at least one fluid film.

13. The concentrator according to claim 8, wherein said assembly of hollow micro-mirror elements is made of glass.

14. The concentrator according to claim 8, wherein said assembly of hollow micro-mirror elements is made of plastic.

15. In a concentrator, a containment sheet containing an assembly of micro-mirrored elements made according to the steps of
   a) passing micro-mirror elements through at least one liquid film wherein said liquid film encapsulates each of said micro-mirror elements;
   b) introducing lubricant between each of said micro-mirror elements and the encapsulating film and;
   c) encasing said collection of encapsulated micro-mirror elements in a containment sheet; and
   sheet wherein said containment sheet is transparent on at least one side.

16. The concentrator according to claim 15, wherein said containment sheet is made of glass.

17. The concentrator according to claim 15, wherein said containment sheet is made of plastic.

18. The concentrator according to claim 15, wherein said lubricant approximately matches the index of refraction of said containment sheet.

19. The concentrator according to claim 15, wherein said micro-mirror elements are spheroidal.

20. The concentrator according to claim 15, wherein said micro-mirror elements are ellipsoidal.

* * * * *